(12) United States Patent
Sun

(10) Patent No.: US 12,665,956 B2
(45) Date of Patent: Jun. 23, 2026

(54) DATA PROCESSING METHOD AND DATA PROCESSING DEVICE

(71) Applicants: China Mobile Communication Co., Ltd Research Institute, Beijing (CN); China Mobile Communications Group Co., Ltd., Beijing (CN)

(72) Inventor: Junshuai Sun, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 462 days.

(21) Appl. No.: 18/249,593

(22) PCT Filed: Oct. 13, 2021

(86) PCT No.: PCT/CN2021/123584
§ 371 (c)(1),
(2) Date: Apr. 20, 2023

(87) PCT Pub. No.: WO2022/089210
PCT Pub. Date: May 5, 2022

(65) Prior Publication Data
US 2024/0022649 A1 Jan. 18, 2024

(30) Foreign Application Priority Data

Oct. 27, 2020 (CN) .......................... 202011162369.4

(51) Int. Cl.
*H04L 69/06* (2022.01)
*H04L 12/64* (2006.01)
(Continued)

(52) U.S. Cl.
CPC .............. *H04L 69/06* (2013.01); *H04L 47/34* (2013.01); *H04L 69/22* (2013.01); *H04L 69/321* (2013.01);
(Continued)

(58) Field of Classification Search
CPC ....... H04L 69/06; H04L 69/22; H04L 69/321; H04L 2012/6448; H04L 69/324;
(Continued)

(56) References Cited

U.S. PATENT DOCUMENTS 11,102,832 B2 * 8/2021 Sharma ............. H04W 36/0066
11,116,036 B2 * 9/2021 Jiang ..................... H04W 80/08
(Continued)

FOREIGN PATENT DOCUMENTS

CN 107359968 A 11/2017

*Primary Examiner* — Angela Widhalm De Rodriguez
(74) *Attorney, Agent, or Firm* — Price Heneveld LLP

(57) ABSTRACT

Embodiments of this application disclose a data processing method and device. The method includes: receiving, through a first bearer between a MAC layer and a user-plane functional entity of layer 3, a MAC SDU sent by the user-plane functional entity of layer 3 and a sequence number assigned to the MAC SDU, wherein all MAC SDUs sent by the first bearer last time correspond to the same sequence number; and generating a MAC PDU according to the received MAC SDU and the sequence number corresponding to the MAC SDU and sending it to a physical layer. The MAC PDU comprises at least one of: an ID of the first bearer, the sequence number, and at least one MAC SDU corresponding to the sequence number.

20 Claims, 4 Drawing Sheets

(51) Int. Cl.

| | | |
|---|---|---|
| *H04L 47/34* | (2022.01) | |
| *H04L 69/22* | (2022.01) | |
| *H04L 69/321* | (2022.01) | |
| *H04L 69/322* | (2022.01) | |
| *H04L 69/324* | (2022.01) | |
| *H04W 28/06* | (2009.01) | |
| *H04W 80/02* | (2009.01) | |

(52) U.S. Cl.
CPC .......... *H04L 69/322* (2013.01); *H04L 69/324* (2013.01); *H04L 2012/6448* (2013.01); *H04W 28/065* (2013.01); *H04W 80/02* (2013.01)

(58) Field of Classification Search
CPC .... H04L 47/34; H04L 69/322; H04W 28/065; H04W 80/02
See application file for complete search history.

(56) References Cited

U.S. PATENT DOCUMENTS

| | | | |
|---|---|---|---|
| 2017/0034862 A1* | 2/2017 | Ma | H04L 69/324 |
| 2018/0213579 A1 | 7/2018 | Hong et al. | |
| 2019/0357289 A1 | 11/2019 | Sharma et al. | |
| 2022/0368481 A1* | 11/2022 | Yang | H04L 1/1642 |

\* cited by examiner

Network
device

11

Terminal

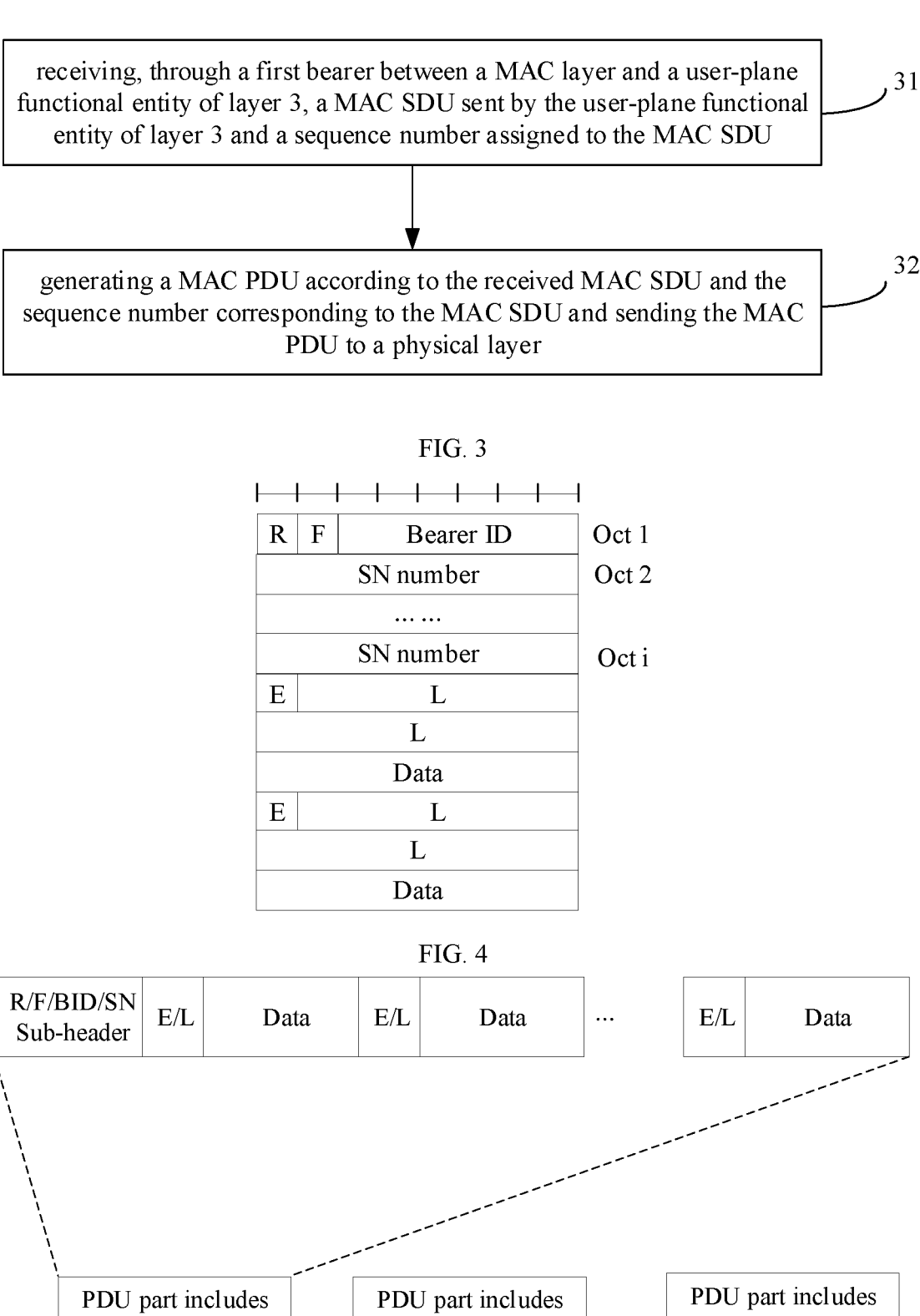

receiving, through a first bearer between a MAC layer and a user-plane functional entity of layer 3, a MAC SDU sent by the user-plane functional entity of layer 3 and a sequence number assigned to the MAC SDU — 31 generating a MAC PDU according to the received MAC SDU and the sequence number corresponding to the MAC SDU and sending the MAC PDU to a physical layer — 32

FIG. 3

| R | F | Bearer ID | Oct 1 |
| SN number | | | Oct 2 |
| ... ... | | | |
| SN number | | | Oct i |
| E | L | | |
| L | | | |
| Data | | | |
| E | L | | |
| L | | | |
| Data | | | |

FIG. 4

| R/F/BID/SN Sub-header | E/L | Data | E/L | Data | ... | E/L | Data |

PDU part includes MAC SDU    ...    PDU part includes MAC SDU    ...    PDU part includes MAC SDU

FIG. 5

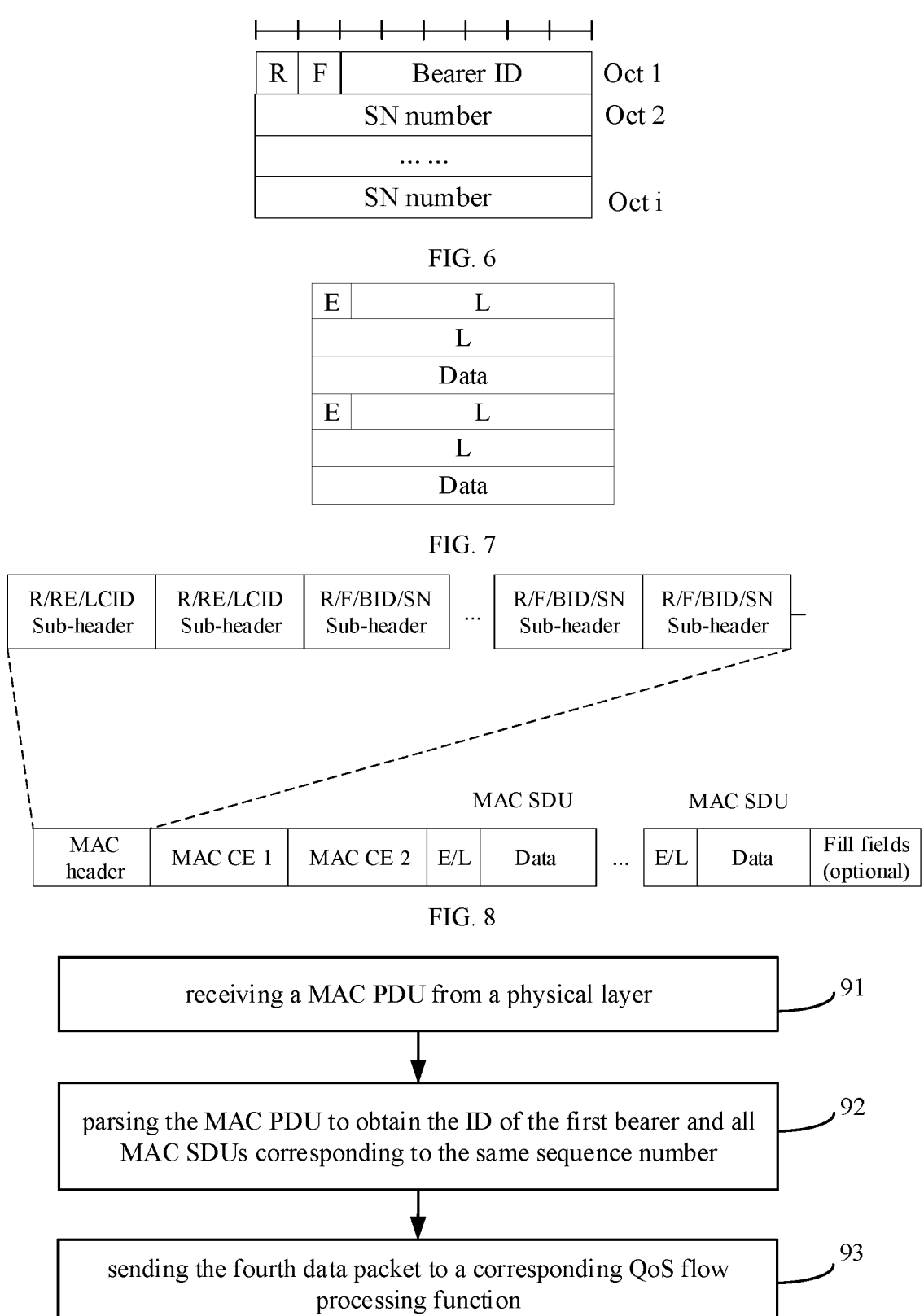

| R | F | Bearer ID | Oct 1 |
|---|---|---|---|
| | SN number | | Oct 2 |
| | ... ... | | |
| | SN number | | Oct i |

FIG. 6

| E | L |
|---|---|
| | L |
| | Data |
| E | L |
| | L |
| | Data |

FIG. 7

| R/RE/LCID Sub-header | R/RE/LCID Sub-header | R/F/BID/SN Sub-header | ... | R/F/BID/SN Sub-header | R/F/BID/SN Sub-header |
|---|---|---|---|---|---|

MAC SDU    MAC SDU

| MAC header | MAC CE 1 | MAC CE 2 | E/L | Data | ... | E/L | Data | Fill fields (optional) |
|---|---|---|---|---|---|---|---|---|

FIG. 8 receiving a MAC PDU from a physical layer — 91 parsing the MAC PDU to obtain the ID of the first bearer and all MAC SDUs corresponding to the same sequence number — 92 sending the fourth data packet to a corresponding QoS flow processing function — 93

FIG. 9

DATA PROCESSING METHOD AND DATA PROCESSING DEVICE

CROSS REFERENCE OF RELATED APPLICATION

The present application is the U.S. national phase of PCT Application No. PCT/CN2021/123584 filed on Oct. 13, 2021, which claims priority of Chinese patent application No. 202011162369.4 filed on Oct. 37, 2020, which are incorporated herein by reference in their entireties.

TECHNICAL FIELD

The present application relates to the technical field of mobile communications, in particular to a data processing method and a data processing device.

BACKGROUND

In the third/fourth/fifth generation mobile communication (3G/4G/5G) system, at the access stratum (Access Stratum, AS) layer (terminal side, network side is the radio resource control (Radio Resource Control, RRC) protocol layer), there is only control plane (Control Plane, CP), that is, only the RRC protocol layer (or sublayer). The RRC protocol layer completes the radio resource control function, and does not have the data processing function for UP plane.

For the design goal of the next-generation mobile communication such as lite network (Lite Network), the User Plane (UP) function is considered to be introduced into Layer 3 (Layer 3, L3) for data processing, and the UP function is introduced into the L3 of the AS.

Therefore, after the UP function is introduced into the AS layer, the existing Layer 2 (Layer 2, L2) packet processing (Packet Processing) function of the AS layer is redesigned to meet the design goal of Lite Network.

SUMMARY

At least one embodiment of the present application provides a data processing method and a data processing device, so as to provide a data processing solution suitable for Lite Network.

According to the first aspect of the present application, at least one embodiment provides a data processing method, which includes:

receiving, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number; and generating a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

According to at least one embodiment of the present application, the generating the MAC PDU according to the received MAC SDU and the sequence number corresponding to the MAC SDU and sending the MAC PDU to the physical layer includes:

constructing the MAC SDU into the MAC PDU according to a receiving sequence of the MAC SDU, and carrying the sequence number corresponding to the MAC SDU in the MAC PDU; and sending, according to the receiving sequence of the MAC SDU, each of the generated MAC PDU to the physical layer.

According to at least one embodiment of the present application, sequence numbers of the MAC SDUs are allocated according to a sending sequence of the MAC SDUs on the first bearer, and sequence numbers of MAC SDUs sent on different first bearers are allocated independently.

According to at least one embodiment of the present application, the MAC PDU includes at least one PDU part, each of the at least one PDU part includes a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

According to at least one embodiment of the present application, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, a second field used to indicate whether there is a MAC SDU after the each MAC SDU, and a data part.

According to at least one embodiment of the present application, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

According to the second aspect of the present application, at least one embodiment provides a data processing method, which includes:

receiving a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3;

parsing the MAC PDU to obtain the ID of the first bearer and all the MAC SDU corresponding to the same sequence number; and sending the at least one MAC SDU corresponding to the same sequence number to the user-plane functional entity of layer 3 through the first bearer according to ordering of the at least one MAC SDU in the MAC PDU.

According to at least one embodiment of the present application, sequence numbers of the MAC SDUs are allocated according to a sending sequence of the MAC SDUs on the first bearer, and sequence numbers of MAC SDUs sent on different first bearers are allocated independently.

According to at least one embodiment of the present application, the MAC PDU includes at least one PDU part, each of the at least one PDU part includes a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

According to at least one embodiment of the present application, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, a second field used to indicate whether there is a MAC SDU after the each MAC SDU, and a data part.

According to at least one embodiment of the present application, the MAC sub-header includes at least one of the following fields:

a third field indicating a length of the first field;

a fourth field indicating the identification (ID) of the first bearer;

a fifth field indicating the sequence number of the MAC SDU carried in the PDU part; or a reserved field.

According to at least one embodiment of the present application, the parsing the MAC PDU to obtain the ID of the first bearer and all MAC SDUs corresponding to the same sequence number includes:

parsing the MAC sub-header in the MAC PDU to obtain the ID of the first bearer carried in the MAC sub-header;

performing parse, starting from a first MAC SDU corresponding to the MAC sub-header, to obtain data of a current MAC SDU according to a first field in the current MAC SDU as parsed, and determining, according to a second field in the current MAC SDU, whether there is still any remaining MAC SDU after the current MAC SDU, until all the MAC SDUs are parsed.

According to a third aspect of the present application, at least one embodiment provides a first device, which includes:

a receiving and processing module, configured to receive, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number; and a sending and processing module, configured to generate a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

According to at least one embodiment of the present application, the sending and processing module is further configured to:

construct the MAC SDU into the MAC PDU according to a receiving sequence of the MAC SDU, and carrying the sequence number corresponding to the MAC SDU in the MAC PDU; and send, according to the receiving sequence of the MAC SDU, each of the generated MAC PDU to the physical layer.

According to at least one embodiment of the present application, sequence numbers of the MAC SDUs are allocated according to a sending sequence of the MAC SDUs on the first bearer, and sequence numbers of MAC SDUs sent on different first bearers are allocated independently.

According to at least one embodiment of the present application, the MAC PDU includes at least one PDU part, each of the at least one PDU part includes a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

According to at least one embodiment of the present application, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, a second field used to indicate whether there is a MAC SDU after the each MAC SDU, and a data part.

According to at least one embodiment of the present application, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

According to a fourth aspect of the present application, at least one embodiment provides a second device, which includes:

a receiving and processing module, configured to receive a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3;

a parsing module, configured to parse the MAC PDU to obtain the ID of the first bearer and all the MAC SDU corresponding to the same sequence number; and a sending and processing module, configured to send the at least one MAC SDU corresponding to the same sequence number to the user-plane functional entity of layer 3 through the first bearer according to ordering of the at least one MAC SDU in the MAC PDU.

According to at least one embodiment of the present application, sequence numbers of the MAC SDUs are allocated according to a sending sequence of the MAC SDUs on the first bearer, and sequence numbers of MAC SDUs sent on different first bearers are allocated independently.

According to at least one embodiment of the present application, the MAC PDU includes at least one PDU part, each of the at least one PDU part includes a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

According to at least one embodiment of the present application, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, a second field used to indicate whether there is a MAC SDU after the each MAC SDU, and a data part.

According to at least one embodiment of the present application, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

According to at least one embodiment of the present application, the parsing module is further configured to:

parse the MAC sub-header in the MAC PDU to obtain the ID of the first bearer carried in the MAC sub-header;

perform parse, starting from a first MAC SDU corresponding to the MAC sub-header, to obtain data of a current MAC SDU according to a first field in the current MAC SDU as parsed, and determining, according to a second field in the current MAC SDU, whether there is still any remaining MAC SDU after the current MAC SDU, until all the MAC SDUs are parsed.

According to a fifth aspect of the present application, at least one embodiment provides a communication device, which includes: a processor, a memory, and a program stored on the memory and executed on the processor. The program, when executed by the processor, causes the processor to implement steps of the method according to first aspect or second aspect.

According to a sixth aspect of the present application, at least one embodiment provides a computer-readable storage medium, where a computer program is stored on the computer-readable storage medium, and the computer program, when executed by a processor, causes the processor to implement steps of the method according to first aspect or second aspect.

In the data processing method and device provided by the embodiments of the present application, the SN assigned by the upper layer is carried in the MAC layer data packet, and the MAC layer carries the SN number in the MAC PDU when constructing the PDU. In addition, one MAC PDU may include a plurality of MAC SDUs corresponding to one SN; furthermore, the MAC layer of the sending end can send the MAC SDUs in the order received from its upper layer, therefore, the embodiments of the present application provide a data processing solution suitable for Lite Network, and realizes the data processing function of each protocol layer under the condition that the user plane function is added in the layer 3 of the device.

BRIEF DESCRIPTION OF THE DRAWINGS

Various other advantages and benefits will become apparent to those ordinarily skilled in the art upon reading the following detailed description of optional embodiments. The drawings are only for the purpose of illustrating a preferred embodiment and are not to be considered as limiting the present application. Also throughout the drawings, the same reference signs are used to designate the same parts. In the drawing:

FIG. 3 is a flowchart of a data processing method according to an embodiment of the present application;

FIG. 4 is a schematic diagram of a packet format in which a MAC SDU and a MAC sub-header are integrated according to an embodiment of the present application;

FIG. 5 is another schematic diagram of the packet format in which the MAC SDU and the MAC sub-header are integrated according to an embodiment of the present application;

FIG. 6 is a schematic diagram of a packet format in which the MAC SDU and the MAC sub-header are separated according to an embodiment of the present application;

FIG. 7 is another schematic diagram of the packet format in which the MAC SDU and the MAC sub-header are separated according to an embodiment of the present application;

FIG. 8 is another schematic diagram of the packet format in which the MAC SDU and the MAC sub-header are separated according to an embodiment of the present application;

FIG. 9 is another flowchart of a data processing method according to an embodiment of the present application;

DETAILED DESCRIPTION

Figure 1:
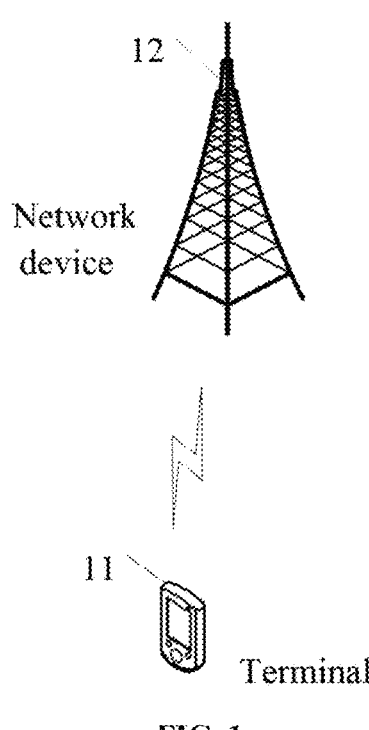
FIG. 1 is a functional schematic view of an AS layer protocol stack.

Exemplary embodiments of the present application will be described in more detail below with reference to the drawings. Although exemplary embodiments of the present application are shown in the drawings, it should be understood that the present application may be achieved in various forms and should not be limited by the embodiments set forth herein. Rather, these embodiments are provided to enable a more thorough understanding of the present application and to fully convey the scope of the present application to those skilled in the art.

Such terms as "first" and "second" in the specification and claims of the present application are used to distinguish similar objects, and are not necessarily used to describe a specific order or sequence. It should be understood that the data so used are interchangeable under appropriate circumstances such that the embodiments of the present application described herein, for example, can be implemented in sequences other than those illustrated or described herein. Furthermore, the terms "comprising" and "having", as well as any variations thereof, are intended to cover a non-exclusive inclusion, for example, a process, method, system, product or device including a sequence of steps or elements is not necessarily limited to those steps or elements explicitly listed, but may include other steps or elements not explicitly listed or inherent to the process, method, product or device. "And/or" in the specification and claims means at least one of the connected objects.

The technology described herein is not limited to the New Radio (NR) system and the Long Time Evolution (LTE)/LTE-Advanced (LTE-A) system, and can also be used for various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. A CDMA system may implement radio technologies such as CDMA2000, Universal Terrestrial Radio Access (UTRA), and the like. UTRA includes Wideband CDMA (Wideband Code Division Multiple Access, WCDMA) and other CDMA variants. A TDMA system can implement a radio technology such as Global System for Mobile Communication (GSM). The OFDMA system can implement the radio technology such as UltraMobile Broadband (UMB), Evolution-UTRA (E-UTRA), IEEE 802.21 (Wi-Fi), IEEE 802.16 (WiMAX), IEEE 802.20, Flash-OFDM, etc. UTRA and E-UTRA are parts of the Universal Mobile Telecommunications System (UMTS). LTE and LTE-Advanced (such as LTE-A) are new UMTS versions that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. However, the following description describes NR systems for example purposes, and NR terminology is used in much of the following description, although the techniques are applicable to applications other than NR system applications as well.

The following description provides examples and does not limit the scope, applicability or configuration set forth in the claims. Changes may be made in the function and arrangement of elements discussed without departing from the spirit and scope of the present application. Various examples may be omitted, substituted, or may add various procedures or components as appropriate. For example, the methods described may be performed in an order different from that described, and various steps may be added, omitted, or combined. Additionally, features described with reference to certain examples may be combined in other examples.

Referring to FIG. 1, FIG. 1 shows a block diagram of a wireless communication system applicable in an embodiment of the present application. The wireless communication system includes a terminal 11 and a network device 12, where the terminal 11 may also be called a user terminal or user equipment (UE, User Equipment), and the terminal 11 may be a mobile phone, a tablet computer (Tablet Personal Computer), a laptop computer (Laptop Computer), a personal digital assistant (Personal Digital Assistant, PDA), mobile Internet device (Mobile Internet Device, MID), wearable device (Wearable Device) or vehicle-mounted device and other terminal side devices. It should be noted that the specific type of the terminal 11 is not limited in the embodiments of the present application. The network device 12 may be a base station and/or a core network element, where the above-mentioned base station may be a base station of 5G and later versions (for example, gNB, 5G NR NB, etc.), or a base station in other communication systems (for example, eNB, wireless local area network (WLAN) access point, or other access point, etc.), where the base station may be called Node B, evolved Node B, access point, base transceiver station (BTS), radio base station, radio transceiver, basic service set (BSS), extended service set (ESS), node B, evolved node B (eNB), home node B, home evolved node B, WLAN access point, Wi-Fi node, or some other appropriate term in the field, as long as the same technical effect is achieved, the base station is not limited to specific technical terms. It should be noted that, in this embodiment of the present application, only the base station in the NR system is taken as an example, but the specific type of the base station is not limited.

The base stations may communicate with terminals 11 under the control of a base station controller, which may be part of a core network or certain base stations in various examples. Some base stations can communicate control information or user data with the core network through the backhaul. In some examples, some of these base stations may communicate with each other directly or indirectly via a backhaul link, which may be a wired or wireless communication link. A wireless communication system may support operation on multiple carriers (waveform signals of different frequencies). A multi-carrier transmitter is capable of transmitting modulated signals on the multiple carriers simultaneously. For example, each communication link may be a multi-carrier signal modulated according to various radio technologies. Each modulated signal may be sent on a different carrier and may carry control information (e.g., reference signal, control channel, etc.), overhead information, data, and so on.

A base station may communicate wirelessly with terminals 11 via one or more access point antennas. Each base station may provide communication coverage for a respective coverage area. The coverage area of an access point may be divided into sectors that constitute only a part of the coverage area. A wireless communication system may include different types of base stations (e.g, macro base stations, micro base stations, or pico base stations). The base stations may also utilize different radio technologies, such as cellular or WLAN radio access technologies. Base stations may be associated with the same or different access networks or operator deployments. The coverage areas of different base stations (including coverage areas of base stations of the same or different types, utilizing the same or different radio technologies, or belonging to the same or different access networks) may be overlapped.

Communication links in a wireless communication system may include uplinks for carrying uplink (Uplink, UL) transmissions (e.g., from terminal 11 to network device 12), or downlinks for carrying downlink (Downlink, DL) transmissions (e.g., from network device 12 to terminal 11). UL transmissions can also be called reverse link transmissions, and DL transmissions can also be called forward link transmissions. Downlink transmissions may be performed using licensed frequency bands, unlicensed frequency bands, or both. Similarly, uplink transmissions may be performed using licensed frequency bands, unlicensed frequency bands, or both.

As mentioned in the background technology, there are some redundant functions in the user plane processing of the existing 5G protocol stack, and the future-oriented protocol stack needs to be flexible and simple in design. In order to simplify the processing flow of the user plane and improve the network efficiency, the embodiment of the present application proposes a new simplified architecture of the user plane of the access network. By integrating the functions of the user plane, the repeated processing functions of each protocol layer can be reduced and the processing efficiency can be improved.

Figure 2:
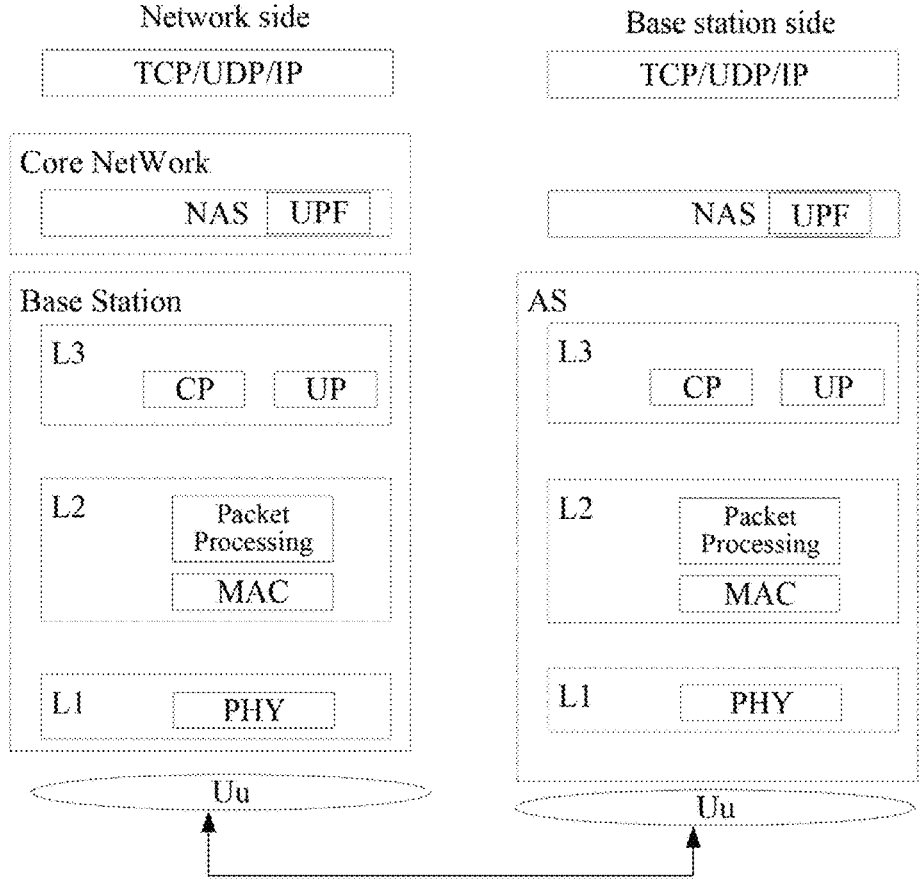
FIG. 2 is a schematic view of an application scenario according to an embodiment of the present application.

The existing L2 packet processing function (Packet Processing) of the AS layer may be redesigned, the new L2 packet processing function is mainly to undertake the upper-layer service data, and combine the channel characteristics of the lower-layer air interface to form QoS indicators and operations that take both the air interface and service characteristics into account. FIG. 2 provides a functional schematic view of a new AS layer protocol stack. The UP of the L3 of the AS layer has the function of sending the IP packet for the first time or more than once. With the introduction of the UP function of L3, the existing data processing function of L2 in the prior art needs to be redefined.

The current two-level user switching scheme based on RRC (collectively referred to as L3 CP) and L3 UP and MAC data processing functions under the control of MAC realizes seamless and lossless switching. In order to realize seamless and lossless switching, when L3 UP sends a data packet to L2, the sequence number (SN) and its corresponding IP packet needs to be sent to the MAC of L2. When the MAC layer constructs a MAC protocol data unit (Protocol Data Unit, PDU), the SN number is currently included in the MAC SDU.

The embodiments of the present application provide an implementation scheme in which L3 UP assigns an SN number to an IP packet, sends it to a MAC, and carries and sends the SN number in the MAC PDU to the air interface. This scheme can be applied to Lite Network and can reduce the complexity of link switching, thereby improving reliability.

To help understanding, the abbreviations of terms that may be involved in the embodiments of the present application are firstly described below.

L1/L2/L3: Layer 1/Layer 2/Layer 3, for example, L1 is the physical layer.

UP: User Plane, that is, the user plane, is a general term for functions related to data processing;

CP: Control Plane, that is, the control plane, is a general term for functions related to data processing and controlling.

L3 UP: is a general term for the data (plane) processing functions of L3.

Referring to FIG. 3, a data processing method is provided by an embodiment of the present application, which is applied to a first device. The first device may be a network-side device or a terminal device. The first device may perform the following steps when sending a data packet, the method includes:

Step 31: receiving, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number.

Here, in the embodiments of the present application, the bearer between the MAC layer and the user-plane functional entity (UP) of L3 may be marked as B_L3_L2. The bearer is a carrier for data transmission between the MAC and the L3 UP. Exemplarily, B_L3_L2 may specifically be a unidirectional bearer, or may be a bidirectional bearer, where the unidirectional bearer has a single function of only sending or receiving. A bidirectional bearer can both send and receive. In addition, one B_L3_L2 may carry one or more data packets of different Internet Protocol (Internet Protocol, IP) addresses (IP flow), that is to say, one B_L3_L2 may carry one or more data packets of different IP flows (IP flow). The sequence numbers (Sequence Number, SN) used when sending IP packets are allocated in units of B_L3_L2, and all IP packets (such as MAC SDUs) carried on B_L3_L2 at a time use the same SN number.

In addition, the SN number is a sequence number corresponding to one or more data packets carried on the B_L3_L2, and different B_L3_L2s use independent SN counting methods respectively. The SN is assigned by the L3 UP of a sending end when sending IP packets. In a case that the L3 UP sends one or more IP packets to the MAC through the B_L3_L2 bearer, all IP packets sent at one time are assigned with one SN number. That is to say, the sequence numbers of the MAC SDUs are allocated according to the sending sequence of the MAC SDUs on the first bearer, and the sequence numbers of the MAC SDUs sent on different first bearers are allocated independently.

Therefore, one SN may correspond to one or more IP packets at the same time. If one SN corresponds to a plurality of IP packets, the L3 UP needs to send the entire IP packet cluster in the order in which these IP packets are received. Here, the IP packet cluster refers to a plurality of IP packets corresponding to the same SN number on one B_L3_L2. In a case that the first device sends an IP packet, the user-plane functional entity of L3 of the device may assign a corresponding SN to one or more IP packets as sent, and send the assigned SN and the corresponding IP packet to the MAC layer of the device. In this way, the MAC layer of the device may receive the MAC SDU sent by the user-plane functional entity of L3 and the sequence number allocated to the MAC SDU through the first bearer between the MAC layer and the user-plane functional entity of L3.

Step 32: generating a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

Optionally, in this step, the MAC layer of the first device may construct the MAC SDU into a MAC PDU according to the receiving sequence of the MAC SDU, carry the sequence number corresponding to the MAC SDU in the MAC PDU; send, according to the receiving sequence of the MAC SDUs, multiple generated MAC PDUs to the physical layer. That is to say, the first time when the first MAC PDU carrying the first MAC SDU is sent to the physical layer is no later than that of the second MAC PDU carrying the second MAC SDU. Here, the time of MAC layer receiving the first MAC SDU is no later than that of the second MAC SDU.

Through the above steps, the embodiments of the present application provide a data processing scheme suitable for the MAC layer and the user-plane functional entity of L3 of the Lite Network, where the SN allocated by the upper layer of the MAC layer is carried in the data packet of the MAC layer, and the MAC layer carries the SN number in the MAC PDU when constructing the PDU. In addition, one MAC PDU may include a plurality of MAC SDUs corresponding to one SN. Furthermore, the MAC layer of the sending end may send the MAC SDUs in an order in which they are received from the upper layer of the MAC layer.

In an embodiment of the present application, the MAC layer of the sending end receives the IP packet sent by the L3 UP, and constructs a MAC PDU. The MAC layer sends the SN and its corresponding IP packet carried in the MAC PDU to the physical layer when receiving the IP packet from the L3 UP. When the MAC layer sends all the IP packets with the same SN number, all the IP packets with the same SN number can be sent in one time or multiple times. In a case that all the IP packets with the same SN number are sent in multiple times, the same SN is used in each MAC PDU, and when the MAC layer sends, the MAC PDUs are constructed and sent according to the order in which MAC PDUs are received from the L3 UP.

As an example, the MAC PDU includes at least one PDU part, each PDU part includes a MAC sub-header and at least one MAC SDU corresponding to the same sequence number, where each MAC SDU includes at least one of the following information: a first field (corresponding to the L field below) configured to indicate a length of the MAC SDU, a second field (corresponding to the E identifier below) configured to indicate whether there is another MAC SDU after the MAC SDU, and a data part.

As another example, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field (corresponding to the L field below) configured to indicate a length of the MAC SDU, a second field (corresponding to the E identifier below) configured to indicate whether there is another MAC SDU after the MAC SDU, and a data part.

In some optional embodiments, the MAC sub-header includes at least one of the following fields:

a third field indicating a length of the first field (corresponding to the F identifier hereinafter);

a fourth field indicating the identification (ID) of the first bearer (corresponding to the bearer ID hereinafter);

a fifth field indicating the sequence number of the MAC SDU carried in the PDU part (corresponding to the SN number hereinafter);

a reserved field (corresponding to the R field below).

An embodiment of the present application also provides a specific structure of the MAC PDU. Specifically, the content included in the MAC PDU may include at least one of the following:

1) Bearer ID (such as the ID of B_L3_L2): the ID of the bearer of the AS layer sending the data packet from the L3 UP to the MAC layer, specifically, may be a logical channel ID (Logical Channel ID, LCD), or may be a radio bearer ID (Radio Bearer ID, RB ID), or may also be an ID in another bearer form capable of sending the data packet from the L3 UP to the MAC layer.

2) SN number: a sequence number assigned by L3 UP to one or more IP packets sent in the current time, which may be used by the receiving end to receive the IP packets in sequence.

3) F identifier: F identifier is configured to identify the length of the L (Length) field indicating the length of the data packet, where the L field may be two types of lengths including 15 bits or 7 bits.

4) E identifier: an indicating identifier, configured to indicate whether there is still a combination of the next data packet and its length field after the data packet.

5) R field, namely the Reserved field, is a reserved field, which may be specifically set to 0.

FIG. 4 and FIG. 5 show a packet format in which MAC SDU and MAC sub-header (sometimes referred to as sub-header in this specification) are integrated, where FIG. 4 provides a composition schematic view of the PDU part (sometimes referred to as MAC sub PDU in this specification), and the MAC SDU and the MAC sub-header are integrated. In FIG. 4:

The length of the F field is 1 bit, where when the value is 1, it means that the length of the L field is 15 bits, and when the value is 0, it means that the length of the L field is 7 bits.

The length of the E field is 1 bit, where when the value is 1, it means that there is still a combination of SDU and L field immediately after the SDU, when the value is 0, it means that the SDU is the last SDU of the PDU part.

The length of the SN is one or more bytes, for example, 4 bytes, the length of the SN may be configured through RRC signaling, or may be pre-agreed as a certain fixed value.

The length of the L field is 15 bits.

FIG. 5 shows a schematic view of a DU part (MAC sub PDU) in a MAC PDU. In FIG. 5, R/F/SN/E/L are respectively the R/F/SN/E/L fields in FIG. 4. The BID is the bearer ID (Bearer ID) in FIG. 2, for example, the ID of B_L3_L2.

FIG. 6, FIG. 7 and FIG. 8 show a schematic view of separation of a MAC SDU and a MAC sub-header (sub-header), where the definitions of R/F/BID/SN and E/L are the same as those in FIG. 4 and FIG. 5, which will not be repeated herein. For R/R/LCID, reference may be made to the definition of related sub-header in the prior art.

The following further introduces the data processing method in the embodiments of the present application from the receiving end.

Referring to FIG. 9, the embodiment of the present application provides another data processing method, which is applied to the second device. The second device may be a network-side device or a terminal device. It should be noted that the second device may be the same device as the first device described above because the device may have sending and receiving functions at the same time. As shown in FIG. 9, the second device may perform the following steps when receiving the data packet, the method includes:

Step 91: receiving a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3.

Here, the MAC layer of the second device receives the MAC PDU from the physical layer. Similar to devices at the sending end, the MAC PDU may include an ID of a bearer for transmitting the at least one MAC SDU between a MAC layer and a user-plane functional entity of L3, a MAC SDU and its sequence number. The sequence numbers of the MAC SDUs are allocated by the device at the sending end according to the sending sequence of the MAC SDUs on the first bearer, and the sequence numbers of MAC SDUs sent on different first bearers are allocated independently.

Step 92: parsing the MAC PDU to obtain the ID of the first bearer and all the MAC SDU corresponding to the same sequence number; and Step 93: sending the at least one MAC SDU corresponding to the same sequence number to the user-plane functional entity of L3 through the first bearer according to ordering of the at least one MAC SDU in the MAC PDU.

Since the same sequence number may correspond to one or more MAC SDUs, in the embodiments of the present application, all MAC SDUs with the same sequence number are parsed and obtained at the MAC layer, and then, the MAC SDUs corresponding to the same sequence number are sent to the user-plane functional entity of L3 of the second device through the first bearer according to ordering of the MAC SDUs in the MAC PDU.

Similarly, as an example of a MAC PDU structure, the MAC PDU may include at least one PDU part, each PDU part include a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

As another example of the MAC PDU structure, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, and a second field used to indicate whether there is a MAC SDU after the each MAC SDU, and a data part.

In some optional embodiments, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

Optionally, in the above step 92, the MAC layer of the second device may parse the MAC sub-header in the MAC PDU to obtain the ID of the first bearer carried in the MAC sub-header, start to parse a first MAC SDU corresponding to the MAC sub-header to obtain data of a current MAC SDU according to a first field in the current MAC SDU as parsed, and determine, according to a second field in the current MAC SDU, whether there are still remaining MAC SDUs after the current MAC SDU, until all the MAC SDUs are parsed.

For example, when the MAC layer of the second device receives and parses the MAC PDU from the lower layer (such as the physical layer (PHY layer)), firstly, the information of the MAC sub PDU is obtained by reading the MAC sub-header (MAC sub-header) from the MAC PDU, the information includes the bearer ID that bears the MAC SDU, and the length of the L field obtained through the F field.

After completing the parsing of the sub-header, the MAC layer parses the first MAC SDU. Whether there is a next SDU after the first MAC SDU is obtained through its E field. If so, the MAC SDU is parsed out according to the length indicated by the L field, the next E+L+SDU combination continues to be read until the last E+L+SDU combination, and the E field may determine that the SDU is the last SDU.

The SN number and all SDUs corresponding to the SN are obtained by parsing, and then these MAC SDUs and SN are sent to the L3 UP of the second device through the bearer indicated by the bearer ID according to the sequence parsed from the MAC PDU.

Regardless of whether the MAC SDU and sub-header are an integral structure or a separation structure of the MAC SDU and sub-header, a complete MAC SDU can determine whether the parsing has been completed through the E/L field. For example, if the MAC SDU and sub-header are an integral structure, after parsing the MAC sub-header, the parsing is performed according to E/L, and E is obtained as 0, then the MAC SDU is the last data packet. If there is still data to be parsed, it is the next MAC SDU packet. For the separation structure of MAC SDU and sub-header, it is determined that the data corresponding to the sub-header has been parsed according to the value of E/L.

After receiving the data packets sent by the MAC layer from the bearer, the L3 UP of the second device sorts the corresponding IP packets according to the SN. Sorting is performed in units of the bearer indicated by the bearer ID. After the sorting is completed, the L3 UP sends the IP packets to its upper layer in sequence, such as the non-access stratum (NAS).

Various methods in the embodiments of the present application are described above. The following will further provide a device for implementing the above-mentioned method.

Figure 10:
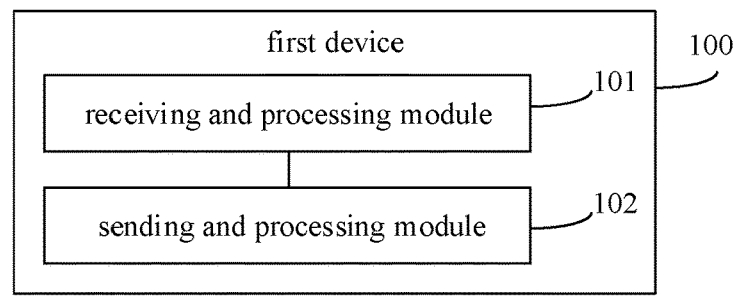
FIG. 10 is a schematic structural diagram of a first device provided by an embodiment of the present application.

Referring to FIG. 10, an embodiment of the present application provides a first device 100, which includes:

a receiving and processing module 101, configured to receive, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number; and a sending and processing module 102, configured to generate a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

Optionally, the sending and processing module is also configured to: construct the MAC SDU into the MAC PDU according to a receiving sequence of the MAC SDU, and carrying the sequence number corresponding to the MAC SDU in the MAC PDU; and send, according to the receiving sequence of the MAC SDU, each of the generated MAC PDU to the physical layer.

Optionally, sequence numbers of the MAC SDUs are allocated according to a sending sequence of the MAC SDUs on the first bearer, and sequence numbers of MAC SDUs sent on different first bearers are allocated independently.

Optionally, the MAC PDU includes at least one PDU part, each of the at least one PDU part includes a MAC sub-header and at least one MAC SDU corresponding to the same sequence number, where each MAC SDU includes at least one of the following information: a first field used to indicate a length of the each MAC SDU, a second field used to indicate whether there is a MAC SDU after the each MAC SDU, and a data part.

Optionally, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the each MAC SDU, a second field used to indicate whether there is a MAC SDU after the each MAC SDU, and a data part.

Optionally, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

It should be noted that the device in this embodiment is a device corresponding to the method shown in FIG. 3 above, and the implementation methods in the above-mentioned embodiments are all applicable to the embodiments of the device and can also achieve the same technical effect. The above-mentioned device provided by the embodiments of the present application can realize all the method steps realized by the above-mentioned method embodiments, and can achieve the same technical effect, and parts and beneficial effects in this embodiment that are the same as those in the method embodiments will not be described in detail herein.

Figure 11:
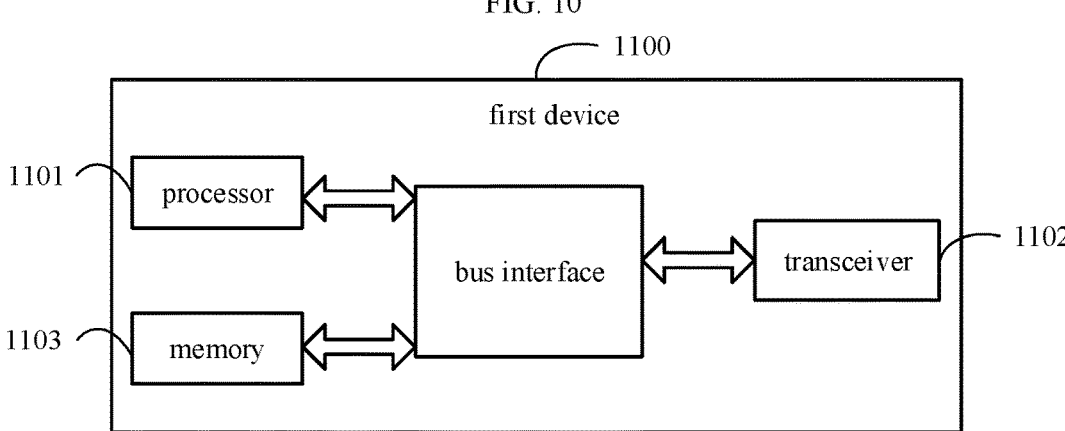
FIG. 11 is another schematic structural diagram of the first device provided by an embodiment of the present application.

Refer to FIG. 11, an embodiment of the present application provides another schematic structural diagram of a first device 1100, including: a processor 1101, a transceiver 1102, a memory 1103, and a bus interface.

In the embodiment of the present application, the first device 1100 further includes: a program stored on the memory 1103 and executed on the processor 1101, where when the program is executed by the processor 1101, the following steps of the method are implemented, where the steps includes:

receiving, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number; and generating a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

It can be understood that, in the embodiments of the present application, when the computer program is executed by the processor 1101, the various processes of the above-mentioned data processing method embodiment shown in FIG. 3 may be realized, the same technical effect can be achieved, and details are not repeated herein to avoid repetition.

In FIG. 11, the bus interface may include any number of interconnected buses and bridges, specifically one or more processors represented by processor 1101 and various circuits of memory represented by memory 1103 are linked together. The bus interface may also be linked together with various other circuits such as peripherals, voltage regulators, and power management circuits, etc., which are well known in the art and therefore will not be further described herein. The bus interface provides the interface. Transceiver 1102 may be a plurality of elements, including a transmitter and a receiver, which provides units for communicating with various other devices over transmission media.

The processor 1101 is responsible for managing the bus architecture and general processing, and the memory 1103 may store data used by the processor 1101 when performing operations.

It should be noted that the terminal in this embodiment is a device corresponding to the method shown in FIG. 5 above, and the implementation methods in the above embodiments are all applicable to the embodiment of the terminal, and can also achieve the same technical effect. In this device, the transceiver 1102 and the memory 1103, as well as the transceiver 1102 and the processor 1101 can be communicated through the bus interface, the function of the processor 1101 can also be realized by the transceiver 1102, and the function of the transceiver 1102 can also be realized by the processor 1101. What needs to be explained here is that the above-mentioned device provided by the embodiment of the present application can realize all the method steps realized by the above-mentioned method embodiment, and can achieve the same technical effect. Parts and beneficial effects in this embodiment that are the same as those in the method embodiment will not be described in detail here.

In some embodiments of the present application, a computer-readable storage medium is also provided, on which a program is stored, and when the program is executed by a processor, the following steps are implemented, the steps includes:

receiving, through a first bearer between a medium access control (MAC) layer and a user-plane functional entity of layer 3, a medium access control service date unit (MAC SDU) sent by the user-plane functional entity of layer 3 and a sequence number assigned to the MAC SDU, where all MAC SDUs sent by the first bearer in the last time correspond to the same sequence number; and generating a medium access control protocol data unit (MAC PDU) according to the received MAC SDU and the sequence number corresponding to the MAC SDU and sending the MAC PDU to a physical layer, where the MAC PDU includes at least one of the following: an identification (ID) of the first bearer, the sequence number, and at least one MAC SDU corresponding to the sequence number.

When the program is executed by the processor, all the implementation methods in the above-mentioned data processing method of the first device applied above can be achieved, and can achieve the same technical effect. To avoid repetition, details are not repeated herein.

Figure 12:
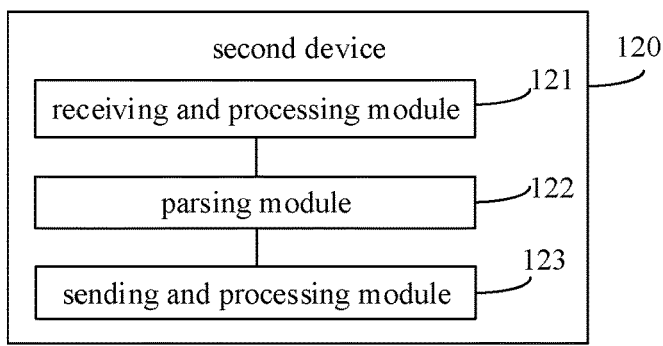
FIG. 12 is a schematic structural diagram of a second device provided by an embodiment of the present application.

Refer to FIG. 12, the embodiment of the present application provides a second device 120, which includes:

a receiving and processing module 121, configured to receive a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3;

a parsing module 122, configured to parse the MAC PDU to obtain the ID of the first bearer and all the MAC SDU corresponding to the same sequence number; and a sending and processing module 123, configured to send the at least one MAC SDU corresponding to the same sequence number to the user-plane functional entity of L3 through the first bearer according to ordering of the at least one MAC SDU in the MAC PDU.

Optionally, sequence numbers of the MAC SDUs are allocated according to sending sequence of the MAC SDUs on the first bearer, and the sequence numbers of MAC SDUs sent on different first bearers are allocated independently.

Optionally, the MAC PDU includes at least one PDU part, each PDU part includes a MAC sub-header and at least one MAC SDU corresponding to the same sequence number, where each MAC SDU includes at least one of the following information: a first field used to indicate a length of the MAC SDU, a second field used to indicate whether there is a MAC SDU after the MAC SDU, and a data part.

Optionally, the MAC PDU includes a MAC header part and a MAC SDU part, where the MAC header part includes a MAC sub-header of at least one PDU part; the MAC SDU part includes the MAC SDU of the at least one PDU part, where each MAC SDU includes: a first field used to indicate a length of the MAC SDU, a second field used to indicate whether there is a MAC SDU after the MAC SDU, and a data part.

Optionally, the MAC sub-header includes at least one of the following fields:

a third field indicating a length of the first field;

a fourth field indicating the identification (ID) of the first bearer;

a fifth field indicating the sequence number of the MAC SDU carried in the PDU part;

a reserved field.

Optionally, the parsing module is further configured to: parse the MAC sub-header in the MAC PDU to obtain the ID of the first bearer carried in the MAC sub-header; and perform parse, starting from a first MAC SDU corresponding to the MAC sub-header, to obtain data of a current MAC SDU according to a first field in the current MAC SDU as parsed, and determining, according to a second field in the current MAC SDU, whether there is still any remaining MAC SDU after the current MAC SDU, until all the MAC SDUs are parsed.

It should be noted that the device in this embodiment is a device corresponding to the method shown in FIG. 9 above, and the implementation methods in the above embodiments are all applicable to this embodiment of the device, and can also achieve the same technical effect. The above-mentioned device provided by the embodiments of the present application can realize all the method steps realized by the above-mentioned method embodiment, and can achieve the same technical effect, parts and beneficial effects in this embodiment that are the same as those in the method embodiment will not be described in detail here.

Figure 13:
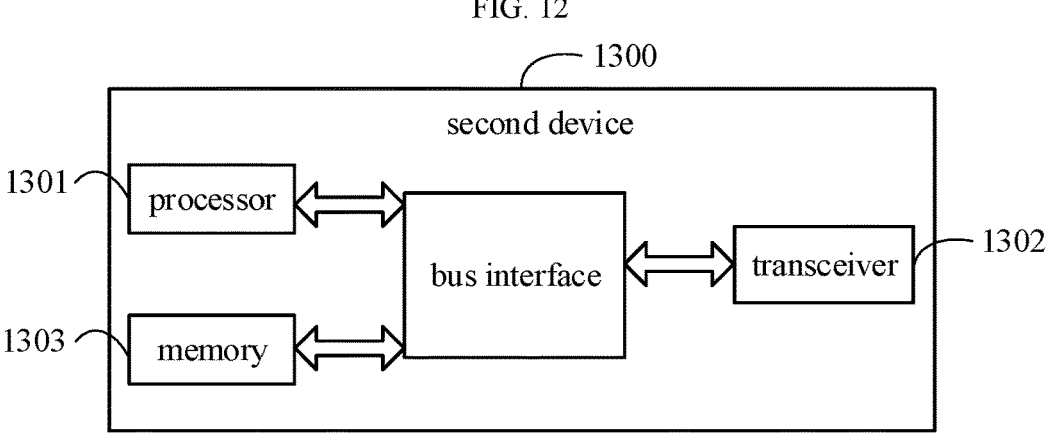
FIG. 13 is another schematic structural diagram of the second device provided by an embodiment of the present application.

Refer to FIG. 13, an embodiment of the present application provides a schematic structural diagram of a second device 1300, including: a processor 1301, a transceiver 1302, a memory 1303, and a bus interface.

In the embodiment of the present application, the second device 1300 further includes: a program stored on the memory 1303 and executed on the processor 1301, where when the program is executed by the processor 1301, the following steps of the method are implemented, where the steps includes:

receiving a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3;

parsing the MAC PDU to obtain the ID of the first bearer and all the MAC SDU corresponding to the same sequence number; and sending the at least one MAC SDU corresponding to the same sequence number to the user-plane functional entity of L3 through the first bearer according to ordering of the at least one MAC SDU in the MAC PDU.

It can be understood that, in the embodiments of the present application, when the computer program is executed by the processor 1301, the various processes of the above-mentioned data processing method embodiments shown in FIG. 9 can be realized, the same technical effect can be achieved, and details are not repeated herein to avoid repetition.

In FIG. 13, the bus interface may include any number of interconnected buses and bridges, specifically one or more processors represented by processor 1301 and various circuits of memory represented by memory 1303 are linked together. The bus interface may also be linked together with various other circuits such as peripherals, voltage regulators, and power management circuits, etc., which are well known in the art and therefore will not be further described herein. The bus interface provides the interface. Transceiver 1302 may be a plurality of elements, including a transmitter and a receiver, which provides units for communicating with various other devices over transmission media.

The processor 1301 is responsible for managing the bus architecture and general processing, and the memory 1303 may store data used by the processor 1301 when performing operations.

It should be noted that the terminal in this embodiment is a device corresponding to the method shown in FIG. 7 above, and the implementation methods in the above embodiments are all applicable to the embodiment of the terminal, and can also achieve the same technical effect. In this device, the transceiver 1302 and the memory 1303, as well as the transceiver 1302 and the processor 1301 can be communicated through the bus interface, the function of the processor 1301 can also be realized by the transceiver 1302, and the function of the transceiver 1302 can also be realized by the processor 1301. What needs to be explained here is that the above-mentioned device provided by the embodiment of the present application can realize all the method steps realized by the above-mentioned method embodiment, and can achieve the same technical effect. Parts and beneficial effects in this embodiment that are the same as those in the method embodiment will not be described in detail here.

In some embodiments of the present application, a computer-readable storage medium is also provided, on which a program is stored, and when the program is executed by a processor, the following steps are implemented, the steps include:

receiving a MAC PDU from a physical layer, where the MAC PDU includes at least one of the following: an ID of a first bearer, a MAC SDU, and a sequence number corresponding to the MAC SDU; the same sequence number corresponds to at least one MAC SDU, and the first bearer is a bearer for transmitting the at least one MAC SDU between a MAC layer and a user-plane functional entity of layer 3;

parsing the MAC PDU to obtain the ID of the first bearer and all the MAC SDU corresponding to the same sequence number; and sending the at least one MAC SDU corresponding to the same sequence number to the user-plane functional entity of L3 through the first bearer according to ordering of the at least one MAC SDU in the MAC PDU.

When the program is executed by the processor, all the implementation methods in the above-mentioned data processing method of the second device applied above can be achieved, and can achieve the same technical effect. To avoid repetition, details are not repeated herein.

Those ordinarily skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may use different methods to implement the described functions for each specific application, but such implementation should not be regarded as exceeding the scope of the present application.

Those skilled in the art can clearly understand that for the convenience and brevity of the description, the specific working process of the above-described system, device and unit can refer to the corresponding process in the foregoing method embodiment, which will not be repeated here.

In the embodiments provided in the present application, it should be understood that the disclosed devices and methods may be implemented in other ways. For example, the device embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication shown or discussed may be achieved through some interfaces, and the indirect coupling or communication of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the embodiment solution in the present application.

In addition, each functional unit in each embodiment of the present application may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the essence of the technical solution of the present application or the part that contributes to the prior art or the part of the technical solution can be embodied in the form of a software product, and the computer software product is stored in a storage medium. Several instructions are included to enable a computer device (which may be a personal computer, a server, or a network device, etc.) to execute all or part of the steps of the method described in each embodiment of the present application. The above-mentioned storage medium includes: U disk, mobile hard disk, read only memory (Read Only Memory, ROM), random access memory (Random Access Memory, RAM), magnetic disk or optical disk, and other media capable of storing program codes.

The above implementations are only specific embodiments of the present application, but the protection scope of the present application is not limited thereto. Any technical person familiar with the technical field can easily think of modifications or substitutions within the technical scope disclosed in the present application, which should be covered within the protection scope of the present application. Therefore, the protection scope of the present application should be based on the protection scope of the claims.

What is claimed is:

1. A data processing method, comprising:

receiving, through a first bearer between a medium access control (MAC) layer and a user-plane functional entity of layer 3, one or more medium access control service data units (MAC SDUs) sent by the user-plane functional entity of layer 3 and one or more sequence numbers assigned to the one or more MAC SDUs, wherein all MAC SDUs sent on the first bearer use the same sequence number; and generating a medium access control protocol data unit (MAC PDU) according to the one or more received MAC SDUs and the one or more sequence numbers corresponding to the one or more MAC SDUs and sending the MAC PDU to a physical layer, wherein the MAC PDU comprises at least one of the following: an identification (ID) of the first bearer, the one or more sequence numbers, and at least one MAC SDU corresponding to the one or more sequence numbers.

2. The method according to claim 1, wherein the generating the MAC PDU according to the one or more received MAC SDU and the one or more sequence numbers corresponding to the one or more MAC SDUs and sending the MAC PDU to the physical layer comprises:

constructing the one or more MAC SDUs into the MAC PDU according to a receiving sequence of the one or more MAC SDUs, and carrying the one or more sequence numbers corresponding to the one or more MAC SDUs in the MAC PDU; and sending, according to the receiving sequence of the one or more MAC SDUs, each of the generated MAC PDU to the physical layer.

3. The method according to claim 1, wherein sequence numbers of the one or more MAC SDUs are allocated according to a sending sequence of the one or more MAC SDUs on the first bearer, and sequence numbers of the one or more MAC SDUs sent on different first bearers are allocated independently.

4. The method according to claim 1, wherein the MAC PDU comprises at least one PDU part, each of the at least one PDU part comprises a MAC sub-header and at least one MAC SDU corresponding to the same sequence number, wherein each MAC SDU comprises at least one of the following information: a first field used to indicate a length of the each MAC SDU, a second field used to indicate whether there is a MAC SDU after the each MAC SDU, and a data part.

5. The method according to claim 1, wherein the MAC PDU comprises a MAC header part and a MAC SDU part, wherein the MAC header part comprises a MAC sub-header of at least one PDU part; the MAC SDU part comprises the one or more MAC SDUs of the at least one PDU part, wherein each MAC SDU comprises: a first field used to indicate a length of the each MAC SDU, a second field used to indicate whether there is a MAC SDU after the each MAC SDU, and a data part.

6. The method according to claim 4, wherein the MAC sub-header comprises at least one of the following fields:

a third field indicating a length of the first field;

a fourth field indicating the identification (ID) of the first bearer;

a fifth field indicating the one or more sequence numbers of the one or more MAC SDUs carried in the PDU part;

a reserved field.

7. A data processing method, comprising:

receiving a MAC PDU from a physical layer, wherein the MAC PDU comprises at least one of the following: an ID of a first bearer, one or more MAC SDUs, and one or more sequence numbers corresponding to the one or more MAC SDUs; the same sequence number corresponds to at least one MAC SDU, and the first bearer is a bearer for transmitting the at least one MAC SDU between a MAC layer and a user-plane functional entity of layer 3;

parsing the MAC PDU to obtain the ID of the first bearer and all the MAC SDUs corresponding to the same sequence number, wherein all MAC SDUs sent on the first bearer use the same sequence number; and sending the at least one MAC SDU corresponding to the same sequence number to the user-plane functional entity of layer 3 through the first bearer according to ordering of the at least one MAC SDU in the MAC PDU.

8. The method according to claim 7, wherein the one or more sequence numbers of the one or more MAC SDUs are allocated according to a sending sequence of the one or more MAC SDUs on the first bearer, and sequence numbers of the one or more MAC SDUs sent on different first bearers are allocated independently.

9. The method according to claim 7, wherein the MAC PDU comprises at least one PDU part, each of the at least one PDU part comprises a MAC sub-header and at least one MAC SDU corresponding to the same sequence number, wherein each MAC SDU comprises at least one of the following information: a first field used to indicate a length of the each MAC SDU, a second field used to indicate whether there is a MAC SDU after the each MAC SDU, and a data part.

10. The method according to claim 7, wherein the MAC PDU comprises a MAC header part and a MAC SDU part, wherein the MAC header part comprises a MAC sub-header of at least one PDU part; the MAC SDU part comprises the one or more MAC SDUs of the at least one PDU part, wherein each MAC SDU comprises: a first field used to indicate a length of the each MAC SDU, a second field used to indicate whether there is a MAC SDU after the each MAC SDU, and a data part.

11. The method according to claim 9, wherein the MAC sub-header comprises at least one of the following fields:

a third field indicating a length of the first field;

a fourth field indicating the identification (ID) of the first bearer;

a fifth field indicating the one or more sequence numbers of the one or more MAC SDUs carried in the PDU part;

a reserved field.

12. The method according to claim 11, wherein the parsing the MAC PDU to obtain the ID of the first bearer and all the MAC SDUs corresponding to the same sequence number comprises:

parsing the MAC sub-header in the MAC PDU to obtain the ID of the first bearer carried in the MAC sub-header;

performing parse, starting from a first MAC SDU corresponding to the MAC sub-header, to obtain data of a current MAC SDU according to a first field in the current MAC SDU as parsed, and determining, according to a second field in the current MAC SDU, whether there is still any remaining MAC SDU after the current MAC SDU, until all the MAC SDUs are parsed.

13. A first device, comprising: a processor, a memory, and a program that is stored on the memory and executable on the processor, wherein the program, when executed by the processor, causes the processor to:

receive, through a first bearer between a medium access control (MAC) layer and a user-plane functional entity of layer 3, one or more medium access control service data units (MAC SDUs) sent by the user-plane functional entity of layer 3 and one or more sequence numbers assigned to the one or more MAC SDUs, wherein all MAC SDUs sent on the first bearer use the same sequence number; and generating a medium access control protocol data unit (MAC PDU) according to the one or more received MAC SDUs and the one or more sequence numbers corresponding to the one or more MAC SDUs and sending the MAC PDU to a physical layer, wherein the MAC PDU comprises at least one of the following: an identification (ID) of the first bearer, the one or more sequence numbers, and at least one MAC SDU corresponding to the one or more sequence numbers.

14. The first device according to claim 13, wherein the processor is further configured to:

construct the one or more MAC SDUs into the MAC PDU according to a receiving sequence of the one or more MAC SDUs, and carrying the one or more sequence numbers corresponding to the one or more MAC SDUs in the MAC PDU; and send, according to the receiving sequence of the one or more MAC SDUs, each of the generated MAC PDU to the physical layer.

15. The first device according to claim 13, wherein the one or more sequence numbers of the one or more MAC SDUs are allocated according to a sending sequence of the one or more MAC SDUs on the first bearer, and sequence numbers of the one or more MAC SDUs sent on different first bearers are allocated independently.

16. The first device according to claim 13, wherein the MAC PDU comprises at least one PDU part, each of the at least one PDU part comprises a MAC sub-header and at least one MAC SDU corresponding to the same sequence number, wherein each MAC SDU comprises at least one of the following information: a first field used to indicate a length of the each MAC SDU, a second field used to indicate whether there is a MAC SDU after the each MAC SDU, and a data part; or wherein the MAC PDU comprises a MAC header part and a MAC SDU part, wherein the MAC header part comprises a MAC sub-header of at least one PDU part; the MAC SDU part comprises the one or more MAC SDUs of the at least one PDU part, wherein each MAC SDU comprises: a first field used to indicate a length of the each MAC SDU, a second field used to indicate whether there is a MAC SDU after the each MAC SDU, and a data part.

17. A second device, comprising: a processor, a memory, and a program that is stored on the memory and executable on the processor, wherein the program, when executed by the processor, causes the processor to implement steps of the method according to claim 7.

18. The second device according to claim 17, wherein the one or more sequence numbers of the one or more MAC SDUs are allocated according to a sending sequence of the one or more MAC SDUs on the first bearer, and the one or more sequence numbers of the one or more MAC SDUs sent on different first bearers are allocated independently.

19. The second device according to claim 17, wherein the MAC PDU comprises at least one PDU part, each of the at least one PDU part comprises a MAC sub-header and at least one MAC SDU corresponding to the same sequence number, wherein each MAC SDU comprises at least one of the following information: a first field used to indicate a length of the each MAC SDU, a second field used to indicate whether there is a MAC SDU after the each MAC SDU, and a data part; or wherein the MAC PDU comprises a MAC header part and a MAC SDU part, wherein the MAC header part comprises a MAC sub-header of at least one PDU part; the MAC SDU part comprises the one or more MAC SDUs of the at least one PDU part, wherein each MAC SDU comprises: a first field used to indicate a length of the each MAC SDU, a second field used to indicate whether there is a MAC SDU after the each MAC SDU, and a data part;

wherein the MAC sub-header comprises at least one of the following fields:

a third field indicating a length of the first field;

a fourth field indicating the identification (ID) of the first bearer;

a fifth field indicating the one or more sequence numbers of the one or more MAC SDUs carried in the PDU part;

a reserved field.

20. The second device according to claim 19, wherein the processor is further configured to:

parse the MAC sub-header in the MAC PDU to obtain the ID of the first bearer carried in the MAC sub-header;

perform parse, starting from a first MAC SDU corresponding to the MAC sub-header, to obtain data of a current MAC SDU according to a first field in the current MAC SDU as parsed, and determining, according to a second field in the current MAC SDU, whether there is still any remaining MAC SDU after the current MAC SDU, until all the MAC SDUs are parsed.

* * * * *